March 2, 1937.  E. C. BERNDT ET AL  2,072,418
IRRADIATING APPARATUS
Filed Oct. 24, 1936  3 Sheets-Sheet 1
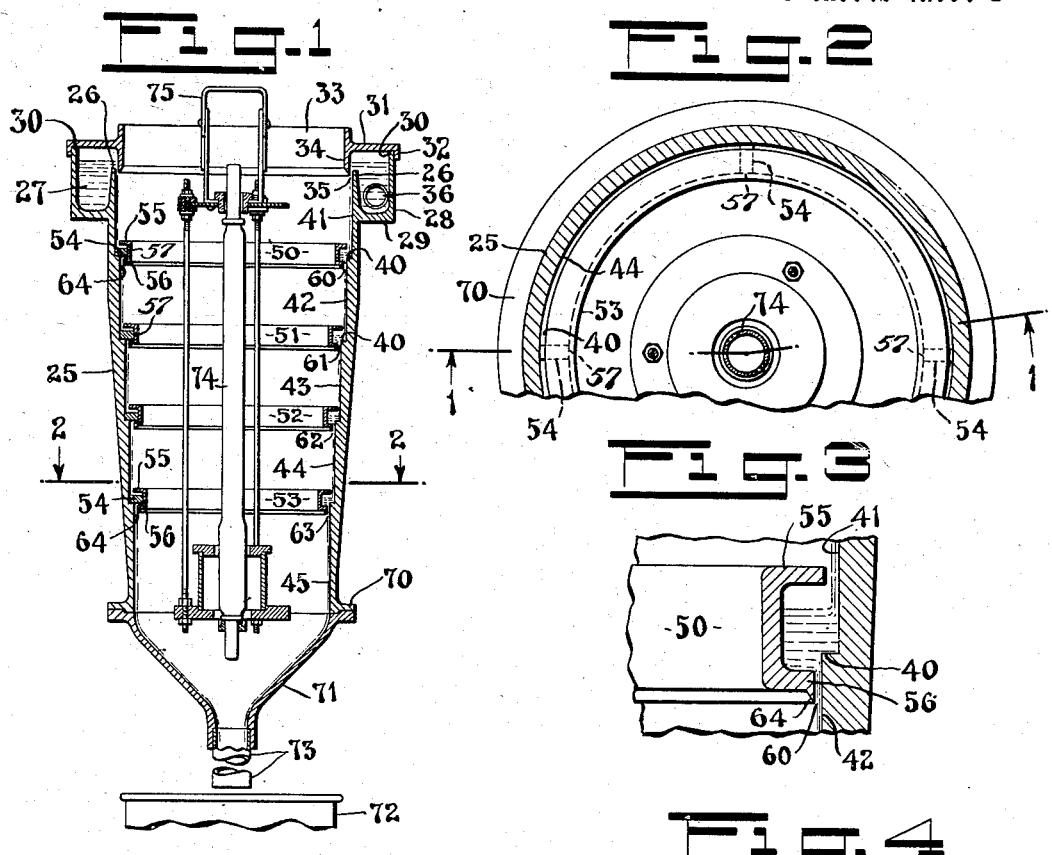
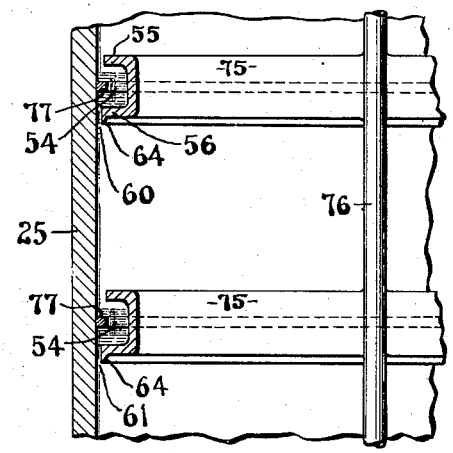
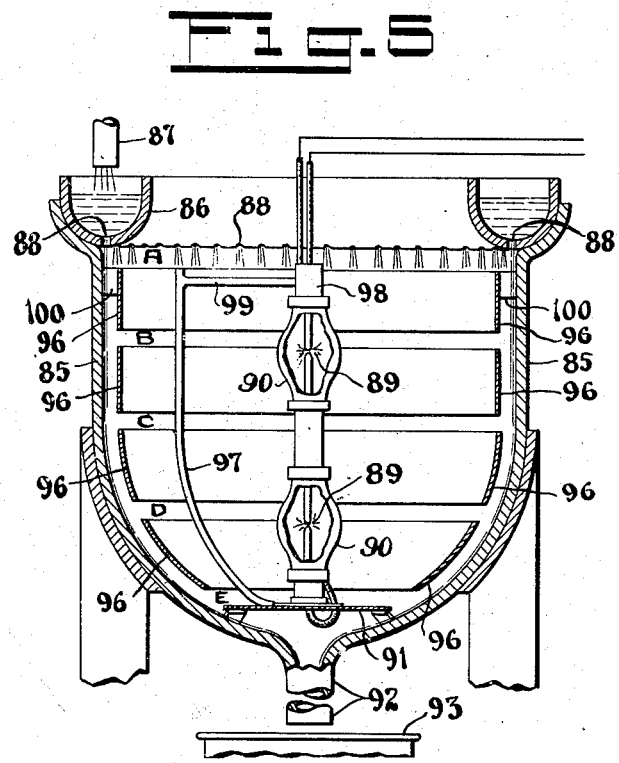
INVENTORS
EDWARD C. BERNDT
HARRY M. CREIGHTON
BY Bohleber & Ledbetter
ATTORNEYS

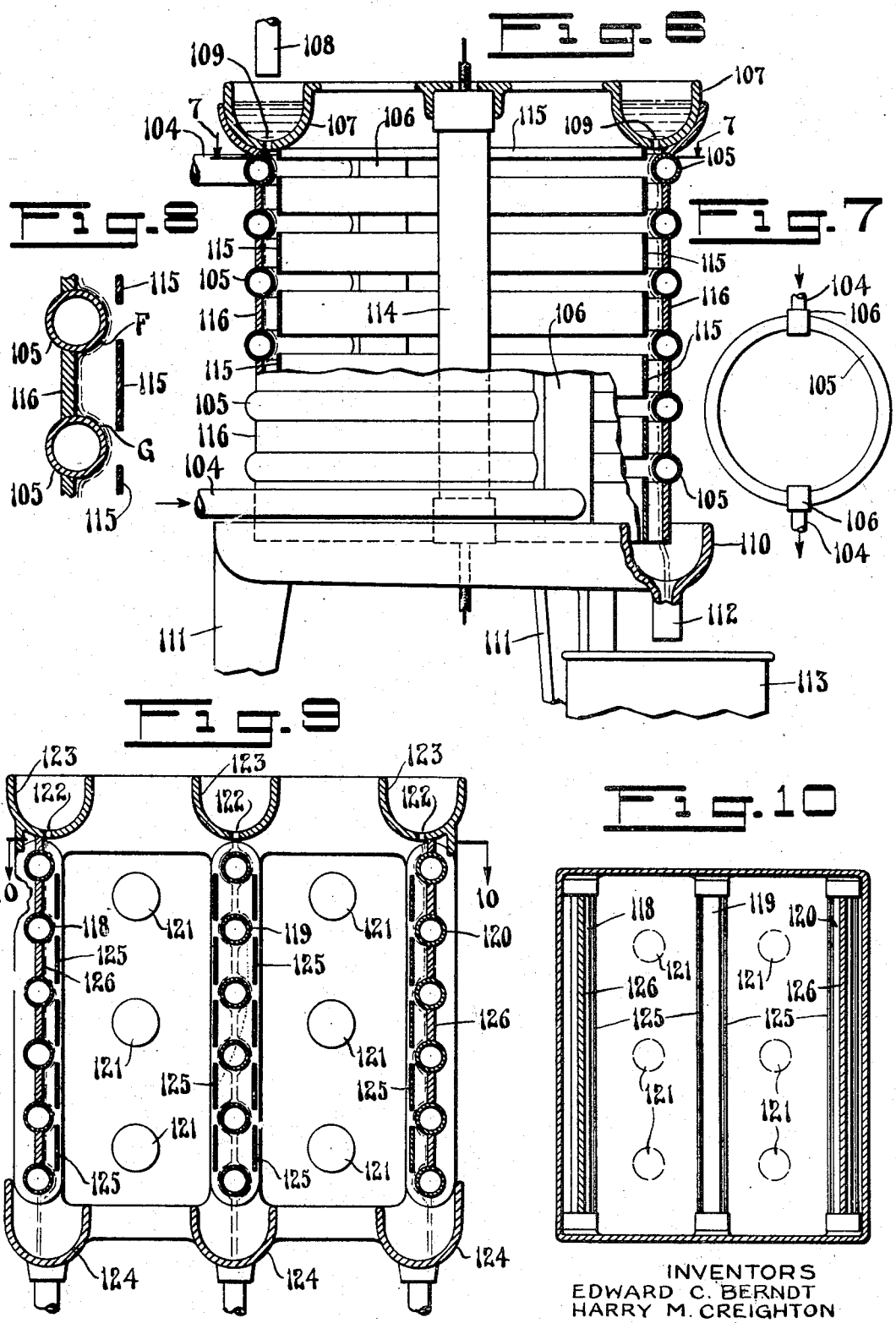

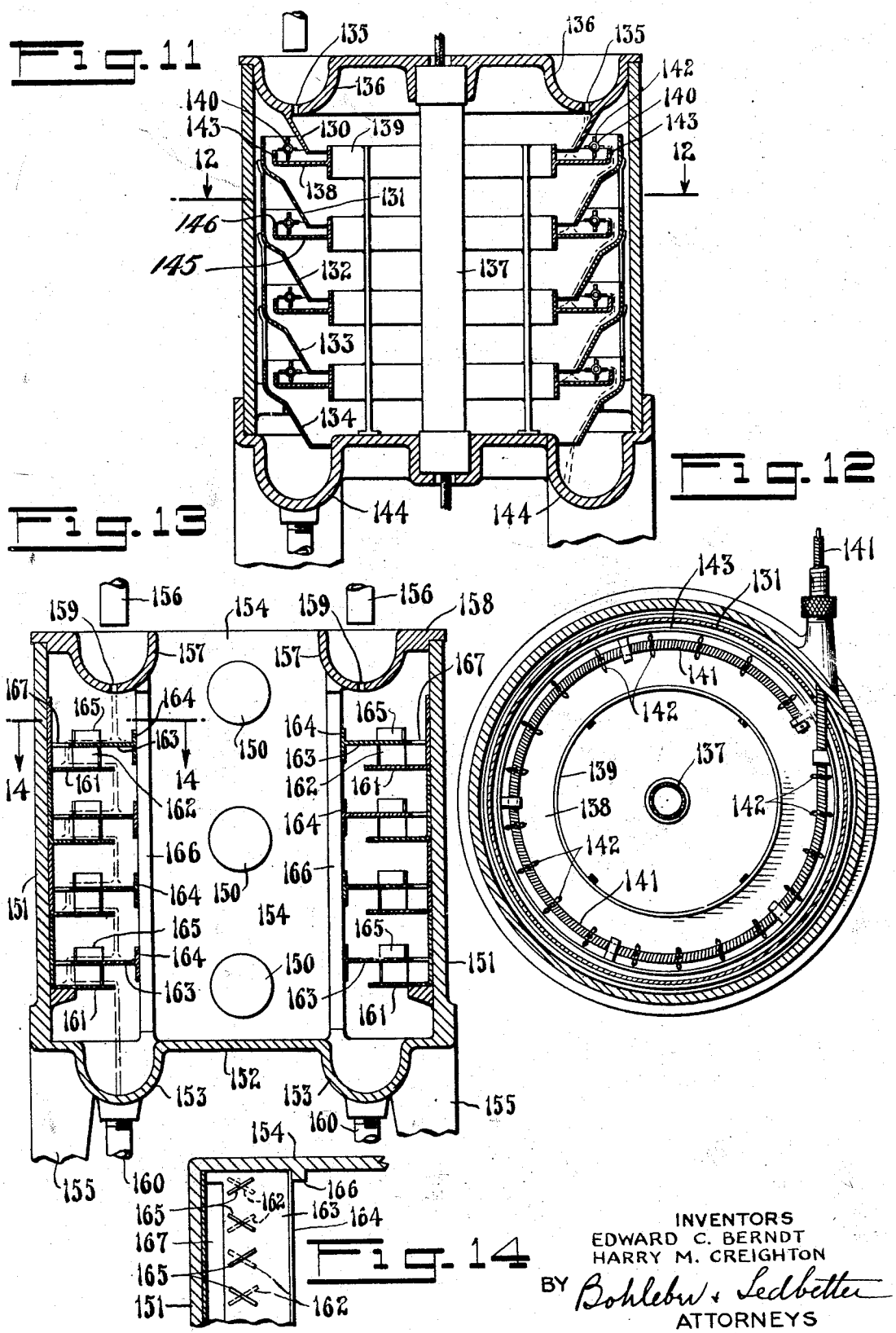

Patented Mar. 2, 1937

2,072,418

UNITED STATES PATENT OFFICE 2,072,418

IRRADIATING APPARATUS

Edward C. Berndt, Norwalk, and Harry M. Creighton, East Norwalk, Conn., assignors to R. U. V. Engineering Corporation, South Norwalk, Conn., a corporation of Delaware Application October 24, 1936, Serial No. 107,361

13 Claims. (Cl. 99—248)

This invention relates to apparatus for treating or irradiating substances with active rays such as ultraviolet rays to impart beneficial properties or effects thereto and more particularly to apparatus for the treatment of such substances as are susceptible of injury during or by an ultraviolet ray treatment.

Furthermore, this invention relates to certain improvements in apparatus for the irradiation of substances particularly described and/or claimed in our Patent No. 2,024,207 entitled Active ray treating devices, filed January 2, 1930; and our copending application entitled Method of irradiating substances with active rays, filed January 16, 1933 and serially numbered 652,020, and is a continuation in part of our copending application Serial No. 707,257 filed January 19, 1934 entitled Method of irradiating substances with active rays.

It is well known that active rays, such as ultraviolet rays, have various effects on different substances. For example, these rays will kill bacteria and also impart to certain substances a property which is now called vitamin D. Active rays will also stimulate bacteria rather than kill them if the treatment is mild enough. Moreover, it has been found desirable to use these rays for the sterilization and/or activation of milk, fruit juices, malt products, wines, spirituous liquors, beer and many other partially opaque substances. There are also other reasons for the treatment of substances with active rays such as to produce beneficial chemical reactions or to irradiate oils and petroleum products to impart to them healing effects or other properties. However, the use of active rays may result in producing both detrimental and beneficial effects, and we have found it is highly important for the irradiation of a substance to be accurately controlled to produce the result desired.

An example of the importance of this control may best be illustrated in the consideration of the irradiation of milk. We know that the germs which infect and propagate in milk can be destroyed with ultraviolet rays. We further know these rays will activate or produce vitamin D in milk when it is irradiated. We also know that certain degrees of over-irradiation of portions of the milk, or particles therein, will change the taste, odor and other properties of the milk to such an extent that it may be impossible or actually dangerous to use it for human food. Hence, in the irradiation of milk it is highly important to accurately control the activation thereof in imparting thereto or inducing a vitamin D effect therein or in the irradiation thereof to sterilize the same, regardless of the degree of the result sought if the milk is to be used for food.

Although ultraviolet rays have been known to have a powerful destructive effect on bacteria, and although workers in this field have experimented with milk sterilization for many years, this use of ultraviolet rays has not, so far as we know, come into commercial use. This same holds true of other substances which are relatively opaque to ultraviolet rays. We have therefore developed a method of irradiation and certain improvements in irradiating apparatus to advance the art of accurately controlled irradiation, for any purpose and particularly in the fields of sterilization and activation and make possible the use of these active rays to better advantage than has been possible with known methods and apparatus.

Accordingly, an important object of our present invention is to produce apparatus in which substances are treated in the form of a downwardly flowing layer and in which the amount of ray energy employed in the treatment is accurately controlled; and wherein the application of such energy is effected under such operating conditions that one is able to forecast the results to be obtained by such treatment when the effect and correlation of the variables attending the treatment of the substances are understood and employed.

One aspect of our method described and claimed in our copending application, above referred to, relates to the irradiation of substances capable of having beneficial or detrimental effects imparted thereto and comprises treating such a substance with a number of relatively short intermittent exposures to radiant energy emanating from one or more sources or stages of active rays, no one of said exposures being sufficient to give the whole body of the substance the amount of treatment necessary to produce the ultimate desired beneficial results or effects, and mixing the substance between exposures such that said mixing takes place away from the action of the rays to permit one to control the distribution and the amount of treatment received by the substances. As explained in our copending application Ser. No. 652,020, the proper combination of the time of each exposure or amount of treatment and the number of exposures will give a much better result than that obtained if the total time of treatment were given without regard to the amount of each exposure. The number of treatments to be given depends, among other things, upon the layer thickness used, the time limits of exposure and the amount of desirable or beneficial effects desired and the amount of undesirable effects that may be tolerated.

Other objects of our invention will become apparent to those skilled in the art from the detailed description taken in connection with the more or less diagrammatic drawings forming a part hereof, and in which Figure 1 illustrates a cross-sectional view, taken on line 1—1 of Figure 2, of an apparatus through which a substance to be irradiated is adapted to flow in the form of a stream or layer from a trough through an orifice down the surface of an irradiator past a source of ultraviolet rays and in which means is provided for periodically mixing the substance by interrupting and retarding the flow of the stream in its course through said irradiator; said means also being adapted to cut off the action of the rays on the substance during the time it is being mixed and again reform said substance into a stream or layer.

Figure 2 is an enlarged cross-sectional view taken on line 2—2 of Figure 1.

Figure 3 is an enlarged detail view showing one of the mixing chambers illustrated in Figure 1 and the manner in which a substance being mixed is shielded from the effects of the rays and thereafter reformed into a stream.

Figure 4 illustrates a modified form of mixing chamber construction for use in combination with an irradiator having a smooth interior surface from top to bottom thereof.

Figure 5 shows an apparatus in which substance being irradiated flows down the inside surface of a vessel past a source of ultraviolet rays and intermittently flows out of the region of said rays by passing behind a plurality of spaced shields to intermittently arrest and prevent the treatment of said substance as it is removed from the effect of the rays emanating from the source.

Figure 6 shows an apparatus comprising a cylindrical cooler coil over which a substance to be irradiated is adapted to flow, from a trough, over the inside surfaces of the pipes of said coil and drop from one pipe to another behind a shield opaque to ultraviolet rays.

Figure 7 is a view taken on line 7—7 of Figure 6 and looking in the direction of the arrows.

Figure 8 is an enlarged cross-sectional view of two of the coils shown in Figure 6 and illustrates the path traversed by the substance in dropping from one coil to another behind the shield.

Figure 9 shows an apparatus in which a substance is adapted to flow from troughs disposed on the top of conventional washboard type cooler coils past a source of ultraviolet rays and periodically be removed from the influence of such rays by passing successively behind a plurality of spaced shields.

Figure 10 is a view taken on line 10—10 of Figure 9 and looking in the direction of the arrows.

Figure 11 shows an apparatus in which a substance is adapted to be treated by flowing under the influence of ultraviolet rays successively down the inside surface of a plurality of conical planes and after passing over each plane to be conducted to a point removed from the action of the rays where the substance is mixed by agitators and thence conducted to another plane to receive a subsequent treatment.

Figure 12 is a view taken on line 12—12 of Figure 9 and looking in the direction of the arrows.

Figure 13 illustrates an apparatus for irradiating a substance as the same passes a source of ultraviolet rays in an open free falling stream and means for periodically interrupting the fall of the substance to cause the same to flow away from the influence of the light to become mixed and thereafter returned to the light for another treatment during a similar subsequent period of fall.

Figure 14 is a sectional view taken on line 14—14 of Figure 13, looking in the direction of the arrows.

Figures 1 and 2 illustrate a preferred form of irradiating device comprising a cylindrical member 25 having a finished upper edge 26. An annular trough 27 is formed integral with the member 25 about the edge 26 by a cylindrical wall 28 and a bottom 29. The upper edge 30 of the wall 28 is located above the edge 26 and serves as a seat for a cover 31 for the trough 27. A depending locating flange 32 is disposed at the periphery of the cover 31. The center portion of the cover 31 is open at 33 for reasons to be hereinafter described and comprises a depending cylindrical flange 34 which forms with the edge 26 a vertical orifice 35 extending circumferentially around the upper portion of the inside surface of the member 35. Any suitable inlet 36 is provided for the trough 27 to conduct thereto, from any suitable source, substance to be treated. Preferably, the inlet 36 is disposed so that substance conducted to the trough 27 enters the same tangentially.

The inside surface of the member 25 is formed throughout the length thereof with a plurality of spaced annular horizontal steps 40 making the inside diameters from top to bottom of the member 25 progressively smaller and thereby forming what may be described as a plurality of surfaces 41, 42, 43, 44, and 45 over which substance to be treated is adapted to flow in a manner to be hereinafter described. A plurality of independently removable rings 50, 51, 52, 53 of generally channel-shaped cross-section, see Figure 3, are supported, respectively, on the steps 40 by means of blocks 54, see Figure 2, secured in any suitable way to the outside circumference of said rings at points intermediate the top and bottom edges of the rings, as shown at 57 in Figures 1 and 2. In the embodiment of our invention here shown, see Figure 2, four blocks 54 are secured to each ring and spaced respectively 90° apart. The rings 50–53 each comprises an upper wall 55 and a lower wall 56. The upper wall 55 of each ring is constructed so that when the rings are located and supported in position in the member 25, the peripheries thereof are spaced, respectively, from the surfaces 41–44 a distance greater than the distance between the flange 34 and the wall 41 forming the orifice 35. Similarly, the lower walls 56 of each ring are so proportioned that when the rings are mounted as above described they form with the cylindrical surfaces 42–45, below each step 40, orifices 60, 61, 62, 63 similar in all respects to the orifice 35 above described, except that said orifices 60–63 are formed, respectively, at the inside of cylindrical treating surfaces slightly smaller in diameter than the surface 41, above described. To prevent the substance being treated from following the under surface of the rings, said surface is cut back to form a lip 64 having a cross-sectional area similar to the lower edge of the flange 34 at orifice 35.

The lower end of the member 25 is formed with a flange 70 to which is connected in any suitable way a funnel-shaped closure member 71 adapted to collect and discharge into a vessel 72 through an outlet 73 the substance which has been treated in the member 25. A quartz mercury vapor lamp 74 is mounted vertically in any suitable way at the axis of the member 25 and connected in the usual way to a source of electrical energy. In the device here shown, the lamp is inserted into the member 25 through the opening 33 and supported from above by means of bracket 75.

In the operation of the device illustrated in Figures 1, 2, and 3, substance to be treated is conducted from any suitable source, not shown, through the inlet 36 to the trough 27 and the rate of flow controlled, so that the level of the substance in the trough 27 will be above the level of the orifice 35 a distance sufficient to give the substance flowing through the orifice 35 an initial velocity, under which it flows down the surface 41 past the end of the wall 55 of ring 50 until it is stopped or interrupted in its regular descent down the surface 41 by the first annular horizontal step 40, and deflected away from the surface 41 into the channel-shaped portion of the ring 50. The orifice 60, formed by the wall 56 of ring 50, being of the same size as orifice 35 will not immediately permit the substance to flow therefrom at the rate which the same is being discharged from the orifice 35. When, however, the substance has accumulated in the pocket or chamber formed by the channel-shaped ring 50 and built up a sufficient head over the orifice 60, then the discharge from the orifice 60 will be equal to that from the orifice 35 and the substance will thereafter descend down the surface 42 and similarly be interrupted in its flow by the next step 40, collect, build-up, and be discharged from the orifice 61, and so on through rings 52 and 53 and orifices 62 and 63, after which it is collected, as above described, in the vessel 72. The sizes of the various orifices are such that a substance will flow vertically between any two rings under such conditions that no substantial mixing takes place during the flow, and hence during the treatment it receives from the lamp 74. Moreover, it will be understood that the rings 50–53 are so positioned and proportioned that in combination with the sides of the member 25 and the steps 40 they form mixing chambers or compartments isolated from the effect of the rays, and in which the substance can be reformed by the orifice outlet from said chamber into another layer forming a new surface to be presented for treatment as said layer flows down the succeeding treating surface. The force with which each descending layer of substance strikes the steps 40 or runs into substance accumulated in the mixing chambers causes the same to be substantially mixed after each treatment. The upper walls 55 or rings 50–53 are proportioned to come as close as possible to the descending stream without touching the same, in order to prevent rays from affecting the substance being mixed in the channel-shaped chambers. It will be understood that the width of the blocks 54 in comparison with the circumferential length of the orifices 60–63 is so small that they afford little or no obstruction to the successive formation of one layer of substance after another as the same flows down the inside of the member 25 and receives treatments from the lamp 74. Finally it will be observed that after the operation of the device the same may readily be cleaned when the rings 50–53 are removed from the member 25, whereupon every surface of the device which has come in contact with the substance being treated may be carefully washed, wiped and inspected.

In Figure 4, we illustrate a modified form of the device shown in Figures 1, 2, and 3 in that the steps 40 are eliminated and the inside surface of the member 25 is made the same diameter throughout the length thereof. In this form of the device a plurality of identical rings 75, somewhat similar to rings 50–53, are secured to and supported in any suitable way by means of a plurality of upright supports 76. The rings and upright supports form a cage-like center piece which may be suspended from the top of the irradiator in any suitable way such that the lamp 74 may be mounted therein as above described, or like those shown in Figure 11 for supporting the shields 139, to be hereinafter described. In this form of device, instead of the steps 40 above described, a continuous deflecting ring 77 is mounted on each of the rings 75 by means of the four blocks 54; the ring 77 being secured to the ends of the blocks 54 in any suitable way forming a plurality of openings through the mixing chamber formed by the rings 75. The outside diameters of the rings 77 are just enough smaller than the inside diameter of the member 25 to permit the same to slip freely into said member. It will be observed that the operation of this modified form of device is similar to that above described in connection with Figures 1, 2, and 3 because both the rings 77 and steps 40 project into the path of the flowing layer to change the direction of flow of the substance and thereby mix the same as above described. In this form of device the cage-like center piece may be removed as a unit for the cleaning and inspection of every surface with which the substance treated has come in contact.

Figure 5 illustrates an apparatus comprising a suitably supported vessel 85 having a trough 86 mounted on the upper edge thereof, into which a substance to be treated is discharged from a pipe 87. Substance from the trough is adapted to pass through perforations 88 in the bottom thereof and run down the inside surface of the vessel 85 past a source of ultraviolet light, such for example as carbon arc lamps 89. The lamps 89 may be of the open flaming arc type or as here shown be provided with a suitable shield 90 transparent to ultraviolet rays. A shield 91 opaque to ultraviolet rays is suitably mounted in the bottom of the vessel to prevent the treatment of substance after it has passed thereunder on its way to an outlet 92 and a collecting container 93. A plurality of spaced opaque shields 96 are mounted in the vessel on supports 97 secured at the bottom to shield 91 and at the top to the lamp mounting 98 by means of a support 99. The top shield 96 is further supported by a web 100 connected to the inside of the vessel 85. Having pointed out the importance of irradiating a substance with a number of properly timed intermittent treatments and then cutting off the action of the rays upon the substance to arrest the treatment thereof during the mixing period, it will be seen that the device shown in Figure 5 is adapted to operate in that manner because it is known that more or less mixing or agitation is constantly taking place in a moving stream. For instance, substance emerging from the trough 86 will receive a treatment as it flows down that portion of the inside surface of the vessel 85 designated by the letter A. Thereafter the substance flows behind the first opaque shield 96 and out of the influence of the rays when it is mixed. After passing from behind the shield, the substance receives a subsequent treatment as it flows over the area B between the first and second shields 96. Similarly it will receive a third, fourth and fifth treatment as it flows over the areas C, D, and E respectively, before being finally removed from the action of the rays by passing under the shield 91 and thence to the outlet 92. In this case the relation between the areas A, B, C, D, and E, and the areas of the shields 96 may be determined empirically according to the substance being treated, the time required for each treatment, and the amount of mixing which inherently takes place in a flowing stream, so that the mixing is substantially negligible during the relatively short time required for the substance to flow over the treating areas and relatively substantial during the time required for the substance to pass behind the shields 96. Finally, a source of active rays must be employed of such effectiveness as to impart a beneficial effect to the substance in the time required for it to pass over the areas A, B, C, D, and E.

Figures 6 and 7 illustrate an irradiating device comprising a cylindrically formed cooler coil 104 comprising a plurality of spaced semi-circular sections or pipes 105 mounted in headers 106 and disposed one above the other. A trough 107, mounted upon the coil 104, receives substance to be treated from any suitable source through pipe 108. Perforations 109 are formed in the bottom of the trough 107 through which the substance flows from the trough 107 and successively over the pipe sections 105 to a trough 110 mounted on supports 111 located at the bottom of the cooler coil. A discharge opening 112 is provided in the trough 110 and adapted to conduct the substance into a collecting container 113. An active ray lamp 114 is axially disposed within the coils 105 and adapted to irradiate the substance to be treated as it traverses its course down the inside of the coils from the trough 107 to the trough 110. A plurality of shields 115, opaque to the active rays, is disposed between the lamp and the coils and adapted to shield the substance from the influence of the rays as it flows and falls behind the shields from one coil to another. A guard 116, to prevent the substance from flowing on the side of the pipes 105 remote from the light, may be provided in cases where it is desired to irradiate a higher percentage of the substance in a single passage through the device.

Figure 8 illustrates the relative position of two coils or pipes 105 with respect to the guard 116 and the shield 115, and emphasizes how a substance, for example, in flowing from points F to G, is removed from the action of the light rays during that period of flow. It will be understood that the relationship between the spaces between the shields and the width of the shields themselves must be correlated to permit a treatment of the flowing substance without substantial mixing and that the flow behind the shields is of sufficient extent to permit the proper amount of mixing to take place preparatory for a subsequent treatment.

Figures 9 and 10 show a device comprising what may be described as conventional cooler coils 118, 119, and 120, arranged in vertical planes or tiers with ultraviolet ray lamps 121 disposed between the tiers. Substance to be treated is adapted to flow through openings 122 in the bottom of an upper trough 123 over the cooler coils and be collected at the bottom of each tier in troughs 124. Suitably proportioned spaced opaque shields 125 are disposed between the tiers of cooler coils and the lamps 121 so that the substance may be periodically removed from the effect of the light rays by flowing behind the shields during its descent down the coils. The middle tier of coils 119 illustrates the manner in which substance will flow simultaneously over both sides of a coil when a guard like that illustrated and described in Figure 8 is not employed and this tier will handle more substance than the outside tiers. Guards 126 may be disposed between the coils in tiers 118 and 120 and will have the effect of increasing the percentage of the substance treated similar to that of the guards 116 above described. It will be understood that while the shields in Figures 5, 6, and 9 are illustrated as being horizontally disposed at predetermined intervals, the horizontal position of itself is not essentially necessary. Suffice it to say that it is merely important to have any type of shield adapted to permit the proper treatment of a flowing substance and shield the same during the subsequent required mixing.

Figures 11 and 12 show an irradiating device comprising a plurality of short conical planes 130, 131, 132, 133, and 134 which planes may be described as having been constructed of circular basins entirely open at the bottom and over the sloping walls of which a substance to be irradiated is adapted to flow through openings 135 in the bottom of a trough 136, successively past a source of ultraviolet rays 137. The length of each of these planes is such that the time required for the substance to flow from the upper edge thereof to the lower edge is sufficient for the substance to receive a proper light treatment, while the distance itself is insufficient to substantially mix the particles of the substance during such treatment. A basin 138 formed behind a shield 139 is disposed at the bottom of the cone 130 and adapted to catch the substance after it has traversed the surface thereof and received its first treatment. Any suitable mechanical agitator, 140, which in this case comprises a flexible cable 141 with paddles 142 thereon, rotated by any suitable means, not shown, is provided for agitating the substance that collects in the basin 138 and until it spills over the rear wall 143 of the basin 138 to the plane 131 where it is again presented for an active ray treatment under conditions similar to that afforded by the plane 130. Substance from the plane 131 is collected in a basin 145 for a subsequent period of agitation before spilling over the walls 146 thereof and descending the plane 132 for the next treatment; and so on. It will be understood that the shields 139 prevent the substance in the basin from being treated, and consequently the mixing which takes place therein is away from the influence of the light. A trough 144 is provided below the plane 134 to catch the treated substance and conduct it to any suitable container.

Figures 13 and 14 illustrate a device for irradiating a substance descending in an open free falling sheet or stream past ultraviolet ray lamps 150. This device preferably comprises a rectangular container having sides 151, a bottom 152, formed with troughs 153 extending lengthwise thereof between end pieces 155. Substance to be treated is delivered through pipes 156 to troughs 157 formed in a cover 158. The troughs 157 are similar to the trough 153 in the bottom 152 and are disposed directly above the same so that if the mixing shelves or baffles and shields, to be hereinafter described, were removed, a sheet or stream of the substance to be treated would fall from the trough 157 through the openings 159 therein, into the troughs 153 and be collected in any suitable container, not shown, as it emerges from outlets 160 provided therefor. A shelf 161, secured to one of the container sides 151 and extending therefrom to a point substantially in line with the opening 159 in the trough 157, assists, by means of a series of angularly disposed stationary agitators 162, in supporting a baffle or catch basin 163 disposed under the opening 159. A shield 164 extending both above and below the surface of the baffle 163 is formed on the front edge thereof to prevent substance which collects in the basin from spilling out towards the lamps 150. A second series of angularly disposed stationary agitators 165 are mounted on the baffle 163. It will be seen, from Figure 14, that the agitators 162 and 165 are oppositely disposed with respect to one another. The baffles 168 receive further support from the ends 154 and ribs 166 which extend from top to bottom of the container at each side thereof. A tier of similar shelves, baffles, agitators and shields are disposed at each side of the lamps 150 and because of their similarity it is deemed unnecessary to describe the same with greater particularity. From the above it will be understood that substance to be treated is permitted to freely fall through the openings 159 and receive an active ray treatment. Thereafter the substance flows away from the light and behind the shield 164, past the agitators 165 and drops from the baffle 163 through openings 167 formed at the rear edge thereof, to the shelf 161 and thereafter flows toward the light past the agitators 162 but still behind the shield 164 until it reaches the edge of the shelf 161 where it drops again in a free falling sheet through a field of active rays emanating from the lamps 150 to receive another treatment. It will be understood that substance in falling successively over the shelves 161 receives a series of short periods of exposure without substantial mixing during each treatment and that between each treatment the substance is mixed in flowing past the stationary agitators before being presented to the rays for a subsequent treatment.

Various modifications in the configuration, composition and disposition of the component elements which in combination constitute our improvements may occur to those skilled in the art, and no limitation is intended by the phraseology of the foregoing description or the exemplary illustrations set forth, or described in connection with the accompanying drawings.

What is claimed is:

1. An apparatus for irradiating with ultraviolet rays a partially opaque liquid in a layer thicker than that through which said rays will effectively penetrate to produce the vitamin D effect or any other beneficial effects therein and without imparting any undesirable detrimental effects thereto, comprising mechanism for producing a moving layer of said liquid and a source of ultraviolet rays to which said layer is exposed, said mechanism including means for successively flowing said layer free from substantial mixing and then mixing the same, in combination with a plurality of means opaque to said rays and located between said source of rays and said layer for shielding the liquid from the effects of said rays while the same is being mixed, and means for supplying to said ultraviolet ray source sufficient energy to impart only beneficial effects to said liquid during the exposures of the latter to said rays.

2. An apparatus for irradiating with ultraviolet rays a partially opaque liquid in a layer thicker than that through which the rays will effectively penetrate to produce the vitamin D effect or any other beneficial effects therein and without imparting any undesirable detrimental effects thereto, comprising mechanism for producing a moving layer of said liquid and a source of ultraviolet rays to which said layer is exposed, said mechanism including means for successively flowing said layer free from substantial mixing and then mixing the same, in combination with a plurality of means opaque to said rays and located between said source of rays and said layer for shielding the liquid from the effects of said rays while the same is being mixed, the amount of ultraviolet ray energy supplied by said source of rays, the distance of the same from said layer, and the speed of said flowing layer while exposed to said rays being so correlated as to impart only beneficial effects to said liquid during the exposures of the latter to said rays.

3. An apparatus for irradiating with ultraviolet rays a partially opaque liquid in a layer thicker than that through which the rays will effectively penetrate to produce the vitamin D effect or any other beneficial effects therein and without imparting any undesirable detrimental effects thereto, comprising mechanism for producing a moving layer of said liquid and a source of ultraviolet rays to which the milk is adapted to be exposed, said mechanism including means for alternately flowing said layer free from substantial mixing and then mixing the same, in combination with a plurality of horizontally arranged and vertically spaced opaque shields between said source of rays and said moving layer for shielding the liquid from the effects of said rays while the same is being mixed, and means for supplying to said ultraviolet ray source sufficient energy to impart only beneficial effects to said liquid during the exposures of the latter to said rays.

4. An apparatus for irradiating with ultraviolet rays a partially opaque liquid in a layer thicker than that through which the rays will effectively penetrate to produce the vitamin D effect or any other beneficial effects therein and without imparting any undesirable detrimental effects thereto, comprising mechanism for producing and conveying by gravity a moving substantially cylindrical layer of said liquid and a source of ultraviolet rays to which said layer is exposed, said mechanism including means for successively flowing said layer free from substantial mixing and then mixing the same and also including a plurality of horizontally arranged and vertically spaced removable means opaque to said rays and located between said source of rays and said layer for shielding the liquid from the effects of said rays while the same is being mixed, and means for supplying to said ultraviolet ray source sufficient energy to impart only beneficial effects to said liquid during the exposures of the latter to said rays.

5. An apparatus for irradiating with ultraviolet rays a partially opaque liquid in a layer thicker than that through which the rays will effectively penetrate to produce the vitamin D effect or any other beneficial effects therein and without imparting any undesirable detrimental effects thereto, comprising mechanism for producing a moving layer of said liquid in combination with means including a source of ultraviolet rays to which said layer is exposed, for successively flowing and exposing said layer free from substantial mixing and then mixing the same, said means also including a plurality of means opaque to said rays and located between said source of rays and said layer for shielding the liquid from the effects of said rays while the same is being mixed, and means for supplying to said ultraviolet ray source sufficient energy to impart only beneficial effects to said liquid during the exposures of the latter to said rays.

6. An apparatus for irradiating with ultraviolet rays a partially opaque liquid in a layer thicker than that through which the rays will effectively penetrate to produce the vitamin D effect or any other beneficial effects therein and without imparting any undesirable detrimental effects thereto, comprising mechanism for producing a hollow downwardly moving layer of said liquid and a source of ultraviolet rays to which the liquid is adapted to be exposed, said mechanism including substantially cylindrical means having a plurality of vertically spaced steps for alternately flowing said layer free from substantial mixing and then mixing the same, in combination with an opaque shield supported on each step and located between said source of rays and said moving layer for shielding the liquid from the effects of said rays while the same is being mixed, and means for supplying to said ultraviolet ray source sufficient energy to impart only beneficial effects to said liquid during the exposures of the latter to said rays.

7. An apparatus for irradiating with ultraviolet rays a partially opaque liquid in a layer thicker than that through which the rays will effectively penetrate to produce the vitamin D effect or any other beneficial effects therein and without imparting any undesirable detrimental effects thereto, comprising mechanism for producing and conveying downwardly a hollow moving layer of said liquid and a source of ultraviolet rays to which the liquid is adapted to be exposed, said mechanism including a smooth substantially cylindrical surface for alternately flowing said layer free from substantial mixing and then mixing the same, in combination with a plurality of horizontally arranged and vertically spaced opaque shields between said source of rays and said moving layer for shielding the liquid from the effects of said rays while the same is being mixed, and means for supplying to said ultraviolet ray source sufficient energy to impart only beneficial effects to said liquid during the exposures of the latter to said rays.

8. An apparatus for irradiating with ultraviolet rays a partially opaque liquid in a layer thicker than that through which the rays will effectively penetrate to produce the vitamin D effect or any other beneficial effects therein and without imparting any undesirable detrimental effects thereto, comprising mechanism for producing a hollow downwardly moving layer of said liquid and a source of ultraviolet rays to which said layer is exposed, said mechanism including means for flowing said layer free from substantial mixing, in combination with a plurality of means opaque to said rays and located between said source of rays and said layer for shielding from the effects of said rays portions of said layer, means on the side of each opaque means remote from said source for mixing portions of said liquid, and means for supplying to said ultraviolet ray source sufficient energy to impart only beneficial effects to said liquid during the exposures of the latter to said rays.

9. An apparatus for irradiating with ultraviolet rays a partially opaque liquid in a layer thicker than that through which the rays will effectively penetrate to produce the vitamin D effect or any other beneficial effects therein and without imparting any undesirable detrimental effects thereto, comprising mechanism for producing a hollow downwardly moving layer of said liquid and a source of ultraviolet rays to which the liquid is adapted to be exposed, said mechanism including means for flowing said layer free from substantial mixing, in combination with a plurality of horizontally arranged and vertically spaced opaque shields between said source of rays and said moving layer for shielding from the effects of said rays portions of the layer, means on the side of each shield remote from said source and cooperating with said mechanism for collecting and mixing portions of said liquid, and means for supplying to said ultraviolet ray source sufficient energy to impart only beneficial effects to said liquid during the exposures of the latter to said rays.

10. An apparatus for irradiating with ultraviolet rays a partially opaque liquid in a layer thicker than that through which the rays will effectively penetrate to produce the vitamin D effect or any other beneficial effects therein and without imparting any undesirable detrimental effects thereto, comprising mechanism for producing a moving layer of said liquid and a source of ultraviolet rays to which said layer is exposed, said mechanism including cooler coil means for successively flowing said layer free from substantial mixing and then mixing the same, in combination with a plurality of means opaque to said rays and located between said source of rays and said layer for shielding the liquid from the effects of said rays while the same is being mixed, and means for supplying to said ultraviolet ray source sufficient energy to impart only beneficial effects to said liquid during the exposures of the latter to said rays.

11. An apparatus for irradiating with ultraviolet rays a partially opaque liquid, to produce the vitamin D effect or any other beneficial effects therein and without imparting undesirable detrimental effects thereto, comprising mechanism for producing a layer of said liquid thicker than that through which the rays will effectively penetrate including means for flowing said layer free from substantial mixing, means for exposing said layer while free from substantial mixing to a predetermined amount of ultraviolet ray energy, means for mixing said layer after such exposure, and means for repeating these operations so that the desired beneficial effects may be attained in said liquid.

12. An apparatus for irradiating with ultraviolet rays a partially opaque liquid in a layer thicker than that through which the rays will effectively penetrate to produce the vitamin D effect or any other beneficial effects therein and without imparting any undesirable detrimental effects thereto, comprising a source of ultraviolet rays, mechanism for flowing said liquid free from substantial mixing, means for exposing said liquid while free from substantial mixing to a predetermined amount of ultraviolet ray energy from said source, means for mixing such liquid after such exposure, and means for repeating these operations, the amount of ultraviolet ray energy supplied by said source, the distance of the same from said layer, and the speed of the flowing layer while exposed to said rays being so correlated as to impart only beneficial effects to said liquid during the exposures of the latter to said rays.

13. An apparatus for irradiating with ultraviolet rays a partially opaque liquid to produce the vitamin D effect or any other beneficial effects therein and without imparting any undesirable detrimental effects thereto, comprising a source of ultraviolet rays to which the liquid is adapted to be exposed and mechanism for conveying the liquid downwardly by gravity in a layer thicker than that through which said rays will effectively penetrate, in combination with horizontally arranged and vertically spaced shielding means opaque to said rays and located between said source of rays and said moving layer for shielding portions of the latter from the effects of said rays, the portions of said layer opposite the space between said shielding means being exposed to said rays and the vertical dimension of said space being relatively short with respect to the vertical dimension of each shielding means whereby the duration of each exposure is sufficiently short that no substantial mixing takes place during such exposure and also whereby the distance of travel of said layer while shielded from said rays enables mixing to take place, and means for producing in said lamp sufficient ultraviolet ray energy to impart only beneficial effects to said liquid during the exposures of the latter to said rays.

EDWARD C. BERNDT.
HARRY M. CREIGHTON.